United States Patent [19]

Nakajima

[11] Patent Number: 4,670,276
[45] Date of Patent: Jun. 2, 1987

[54] PROCESS FOR PRODUCING SANDWICH-LIKE FOODS BASED ON SURIMI

[75] Inventor: Shoji Nakajima, Niigata, Japan

[73] Assignee: Yamanaka Syokuhin Kogyo Co., Ltd.

[21] Appl. No.: 815,443

[22] Filed: Dec. 31, 1985

[51] Int. Cl.⁴ .............................................. A23L 1/325
[52] U.S. Cl. .................................... 426/274; 426/513; 426/517; 426/582; 426/643
[58] Field of Search ............... 426/274, 275, 643, 574, 426/582, 92, 513, 517

[56] References Cited

U.S. PATENT DOCUMENTS 1,721,406  7/1929  Parsons ................................. 426/92
4,181,749  1/1980  Niki et al. ........................... 426/643
4,530,847  7/1985  Natori ................................. 426/643

OTHER PUBLICATIONS

Berolzheimer, 500 Tasty Sandwiches, published by Consolidated Book Publishers, 1952, p. 8.

Primary Examiner—George Yeung
Attorney, Agent, or Firm—McGlew and Tuttle

[57] ABSTRACT

A novel sandwich-like food giving a soft feeling to the palate can be produced by heating and drying surimi and then forming the thus treated surimi into first and second continuous sheets; ejecting molten cheese, molten cheese mixed with minced salami, or a raw meat mixture for the manufacture of salami and placing it on the first continuous sheet of ground fish meat so as to form a continuous layer; superposing thereon the second continuous sheet of SURIMI; pressing these components into a sandwich form; drying the resulting sandwich-like product; and then cutting the dried sandwich-like product into pieces of a size suitable for use as food.

11 Claims, No Drawings

PROCESS FOR PRODUCING SANDWICH-LIKE FOODS BASED ON SURIMI

BACKGROUND OF THE INVENTION (1) Field of the Invention

This invention relates to a process for producing sandwich-like foods composed of two continuous sheets of surimi having interposed therebetween a layer of cheese, cheese filled with minced salami, or a raw meat mixture for the manufacture of salami.

The surimi thus obtained is usually preserved under refrigeration. The term "surimi" used herein means fish meat in the form of paste, which is obtained by washing fresh fish meat with water to remove skin, bone and oil contained therein and then crushing the fish meat added with sugar, sodium pyrophosphate and salt by means of a crusher or silent cutter.

(2) Description of the Prior Art

With the recent diversification of foods, a variety of food products comprising cheese or salami combined with various foodstuffs have come on the market. Among others, sandwich-like foods comprising sheets of processed fish meat with cheese interposed therebetween have recently become popular for use as snacks, because they have not only a high nutritive value but also a tasty flavor. However, such sandwich-like foods have been produced by interposing a slice (cut to a suitable thickness and suitable size) or sheet of solid cheese between two sheets made of fish meat and then heating the top and bottom surfaces of the fish meat sheets in an oven. Accordingly, this method is not suitable for purposes of mass production in a continuous system. In addition, this method has the practical disadvantage of requiring complicated procedures because the temperature and time employed in heating the fish meat sheets must be carefully controlled so as not to scorch them.

On the other hand, sandwich-like foods comprising fish meat sheets with salami interposed therebetween have the disadvantage that the hard salami causes a disagreeable sensation to the palate.

SUMMARY OF THE INVENTION

The present invention has been completed in view of the above-described disadvantages of conventional methods for producing sandwich-like foods based on fish meat, and it is the primary object of the present invention to provide a continuous process for efficiently producing such sandwich-like foods in a form giving a soft feeling to the palate.

In accordance with one feature of the present invention, surimi is previously heated and dried to form first and second continuous sheets thereof (which may conveniently be rolled up like belts). While the first continuous sheet is being moved, molten cheese, molten cheese mixed or filled with minced salami, or a raw meat mixture for the manufacture of salami is ejected and placed thereon so as to form a continuous layer having a predetermined width and predetermined thickness. Then, the second continuous sheet is superposed thereon and the components thus combined are pressed into a sandwich form having a predetermined thickness. Where molten cheese or molten cheese mixed with minced salami is used, the resulting sandwich-like product is dried at a low temperature to adjust its average water content to about 33–38% and then cut to a size suitable for use as food, thus yielding a final product. Where a raw meat mixture for the manufacture of salami is used, the resulting sandwich-like product is heated under controlled humidity conditions and then dried. Thereafter, it is cut to a size suitable for use as food, thus yielding a final product.

In accordance with another feature of the present invention, the aforesaid molten cheese is prepared by placing powdered process cheese in a emulsifier, heating the cheese for five to seven minutes with the introduction of steam until the temperature reaches about 85° C., and then stirring the cheese under deaerating conditions.

DETAILED DESCRIPTION OF THE INVENTION

In the practice of the present invention, surimi which has been prepared in the usual manner is first heated (for example, by steam heating) and dried to form two continuous sheets having, for example, a width of about 50 mm. and a thickness of about 1.5 cm. These continuous sheets may conveniently be rolled up like belts.

Then, process cheese is reduced to powder by means of a silent cutter, and the resulting powdered cheese is placed in a high-pressure pot and heated for five to seven minutes with the introduction of steam. As soon as the temperature has reached about 85° C., the cheese is stirred for about 2 minutes under deaerating conditions to obtain molten cheese having a water content in the vicinity of 50%. It should be mentioned in this connection that it has hitherto been considered difficult to melt cheese without a loss of flavor, but the above-described technique makes it possible to prepare molten cheese retaining its flavor.

According to the process of the present invention, one of the continuous sheets formed in the above-described manner is moved, for example, by placing it on a belt conveyor. While the continuous sheet is being moved, the molten cheese prepared in the above-described manner (and stored in a jacketed hopper kept at about 80° C. so as to prevent its solidification) is ejected and placed thereon. This may conveniently be accomplished by ejecting the molten cheese through a fan-shaped nozzle attached to the tip of a spiral-high pressure pump, and it is usually preferable to eject the molten cheese in such a way that it is uniformly spread in the form of a continuous layer having a thickness of about 5 mm and a width of about 35 cm. "A spiral-high pressure pump used herein is a high pressure pump having a spiral screw axis suitable for transferring a paste material. Thereafter, the other continuous sheet of surimi formed in the above-described manner is superposed on the continuous layer of molten cheese. This step may be carried out while the first continuous sheet is still being moved.

The components thus combined (i.e., the two continuous sheets of surimi and the molten cheese interposed therebetween) are passed between two rollers adjusted to a predetermined spacing to obtain a sandwich-like product having an average thickness of about 5 mm. Then, this sandwich-like product is cut into strips measuring about 10 cm × 50 cm. These strips are placed on screens and introduced into a cold chamber (at a temperature in the range of about 5° C. to about 15° C.). By allowing the strips to stand overnight, the water contained in the cheese diffuses to the surimi sheets so as to make their overall water content uniform. At this point, the strips are dried for about 1 hour with a cold-air dryer to adjust their average water content to a level of about 34% to about 38% which permits the resulting product to give a soft feeling to the palate. The dried strips of the sandwich-like product are cut to pieces of a size suitable for use as food (for example, sticks measuring about 3 mm in width, about 5 mm in thickness and about 110 mm in length), thus yielding a final product.

According to the above-described process for producing sandwich-like foods, a sandwich-like food including salami and cheese can be obtained in the same manner except that the molten cheese is replaced by molten cheese mixed with minced salami. Such molten cheese mixed with salami may be prepared as follows: Powdered cheese is heated according to the same procedure as described above. As soon as the temperature has reached about 85° C., the heating is discontinued temporarily. An appropriate amount of minced salami prepared in the usual manner is added to the molten cheese (at the same time, such spices as mustard may be added thereto as desired), and the heating is then resumed. When the temperature has reached about 90° C., the mixture is stirred for two minutes under deaerating conditions. The resulting molten cheese mixed with minced salami sausage is transferred to a jacketed hopper kept at about 80° C. so as to prevent its solidification.

In the practice of the present invention, a raw meat mixture for the manufacture of salami may be used in place of the molten cheese. According to conventional procedure, such a raw meat mixture is prepared by adding sodium nitrite, nitrates, polyphosphates, sodium L-ascorbate, sorbic acid, spices, seasoning and other well-known additives to chopped raw meat and kneading these ingredients well, Then, the same procedure as described above for molten cheese is repeated. Specifically, while a continuous sheet of surimi is being moved, the aforesaid raw meat mixture is ejected through a fan-shaped nozzle attached to the tip of a spiral-high pressure pump and placed thereon so as to form a continuous layer having a thickness of about 5 to about 8 mm and a width of about 35 cm. While the surimi sheet with the raw meat mixture placed thereon is still being moved, another continuous sheet of surimi is superposed thereon. The components thus combined are passed between two rollers adjusted to a predetermined spacing to obtain a sandwich-like product having an average thickness of about 5 mm. Then, this sandwich-like product is cut into strips of suitable size. These strips are placed on screens and heated under controlled humidity conditions. For example, they may be introduced into a chamber kept at a humidity about 80% and a temperature of about 80° C., and heated for about 1.5 hours to raise their temperature to about 70° C. After being heated as described above, the strips are dried at a temperature of 35° C. to 40° C. with a warm-air dryer to make their overall water content uniform. Thereafter, the strips are cut to a size suitable for use as food, thus yielding a final product.

As described above, the present invention makes it possible to produce sandwich-like foods based on fish meat in a continuous manner by moving a heated and dried continuous sheet of surimi, ejecting molten cheese, molten cheese mixed with minced salami, or a raw meat mixture for the manufacture of salami and placing it thereon so as to form a continuous layer, and then superposing thereon another heated and dried continuous sheet of surimi.

Moreover, since the sandwich-like foods produced by the process of the present invention comprise sheets made of surimi and molten cheese or salami paste interposed therebetween, they give a soft feeling to the palate, are agreeable to eat, and can be considered to be very suitable for use as a snack because of the harmony between the taste of fish meat and the flavors of cheese and/or salami.

In order to preserve the sandwich-like foods produced in the above-described manner as commercial products, they may be packed and sealed in packages made of a suitable synthetic resin material (for example, a K nylon/polyethylene laminated film) and containing a deoxidant as an antimold agent. Thus, no change in the quality of the product will be noted even after 3 months or more.

The present invention will be more clearly understood with reference to the following examples. However, these examples are intended to further illustrate the invention and are not to be construed to limit the scope of the invention.

EXAMPLE 1

Formation of surimi sheets:

Surimi of codfish which had been prepared in the usual manner was heated and dried to form two continuous sheets having a width of 50 cm and a thickness of 1.5 mm. These continuous sheets were rolled up like belts.

Preparation of molten cheese:

Process cheese was reduced to powder by means of a silent cutter and the resulting powdered cheese was placed in a high-pressure pot and heated for about 6 minutes with the introduction of steam. As soon as the temperature had reached about 85° C., the cheese was stirred for 2 minutes under deaerating conditions to obtain molten cheese (having a water content of 50%). This molten cheese was immediately withdrawn from the pot and transferred to a jacketed hopper kept at about 80° C. so as to prevent its solidification.

Formation of a sandwich-like food:

While one of the aforesaid surimi sheets rolled up like belts was being moved on a belt conveyor, the aforesaid molten cheese was ejected through a fan-shaped nozzle attached to the tip of a spiral-high pressure pump and placed thereon so as to form a continuous layer having a thickness of about 5 mm and a width of 35 cm. While the surimi sheet with the molten cheese placed thereon was still being moved, the other surimi sheet was superposed thereon. The components thus combined were passed between two rollers adjusted to a predetermined spacing to obtain a sandwich-like product having an average thickness of about 5 mm. Then, this sandwich-like product was cut into strips measuring 10 cm×50 cm. These strips were placed on screens, which were mounted on a push car and introduced into a cold chamber. By allowing the strips to stand overnight, the water contained in the cheese diffused to the surimi sheets so as to make their overall water content uniform. At this point, the strips were dried for about 1 hour with a cold-air dryer to adjust their average water content to about 35%. The dried strips were cut into sticks measuring about 3 mm in width, about 5 mm in thickness and about 110 mm in length, thus yielding a final product. The product thus obtained gave a soft feeling to the palate and had a tasty flavor.

Then, in order to improve its keeping quality, the product was packed and sealed in ordinary bags made of an OP/CP (Oriented polypropylene/Cast polypropylene) laminated film and containing, as an antimold agent, powdered alcohol formed by adsorbing ethyl alcohol to starch, dextrin, methyl cellulose or the like (commercially available under the trade name of Antimold). Thus, no change in the quality of the product was noted even after a lapse of three months or more.

EXAMPLE 2

Preparation of minced salami:

Salami which had been made in the usual manner was minced to a size of the order of 1 mm. Thus, 7.5 kg of minced salami was prepared.

Preparation of salami-molten cheese mixture:

Process cheese was reduced to powder by means of a silent cutter. 12.5 kg of the resulting powder cheese was placed in a high-pressure pot and heated for about 6 minutes with the introduction of steam. As soon as the temperature reached about 85° C., the heating was discontinued. After the addition of 7.5 kg of the aforesaid minced salami and 43 cc of molucca mustard as a spice, the heating was resumed. When the temperature reached about 90° C., the mixture was stirred for about 2 hours under deaerating conditions.

The resulting salami-molten cheese mixture (having a water content of about 50%) was withdrawn from the pot and transferred to a jacketed hopper kept at about 80° C. so as to prevent its solidification.

Formation of ground fish meat sheets:

Surimi of codfish which had been prepared in the usual manner was heated and dried to form two continuous sheets having a width of 50 cm and a thickness of 1.5 mm. These continuous sheets were rolled up like belts.

Formation of a sandwich-like food:

While one of the aforesaid surimi sheets rolled up like belts was being moved on a belt conveyor, the aforesaid salami-molten cheese mixture was ejected through a fan-shaped nozzle attached to the tip of a spiral-high pressure pump and placed thereon so as to form a continuous layer having a thickness of about 5 mm and a width of 35 cm. While the surimi sheet with the salami-molten cheese mixture placed thereon was still being moved, the other surimi sheet was superposed thereon. The components thus combined were passed between two rollers adjusted to a predetermined spacing to obtain a sandwich-like product having an average thickness of about 5 mm. Then, this sandwich-like product was cut into strips measuring 10 cm×50 cm. These strips were placed on screens, which were mounted on a push car and introduced into a cold chamber. By allowing the strips to stand overnight, the water contained in the cheese diffused to the surimi sheets so as to make their overall water content uniform. At this point, the strips were dried for about 1 hour with a cold-air dryer to adjust their average water content to about 35%. The dried strips of the sandwich-like product were cut into sticks measuring about 3 mm in width, about 5 mm in thickness and about 110 mm in length, thereby yielding a final product. Though containing salami sausage, the product thus obtained, as a whole, gave a soft feeling to the palate and tasted good because of the harmonized flavors of cheese, salami sausage and codfish.

Then, in order to improve its keeping quality, the product was packed and sealed in ordinary bags made of an OP/CP laminated film and containing, as an antimold agent, either powdered alcohol formed by adsorbing ethyl alcohol to starch, dextrin, methyl cellulose or the like (commercially available under the trade name of Antimold) or a commercially available deoxidant. Thus, no change in the quality of the product was noted even after a lapse of three months or more.

Where powdered alcohol is used as the antimold agent, not only bags made of an OP/CP laminated film, but also ordinary bags made of cellophane or OP may be used for packaging purposes. Where a deoxidant is used as the antimold agent, it is desirable to use bags made of a KOP/CP (Polyvinylidene chloride coat/Cast polypropylene), K nylon/PE (Nylon coat/Polyethylene), OV/CP (Oriented vinylon/Cast polypropylene) or other laminated film.

EXAMPLE 3

Preparation of a raw meat mixture for the manufacture of salami:

Frozen pork, beef, horsemeat, mutton and chicken were used as raw materials. These raw materials were thawed and cut with a frozen cutter into blocks measuring 1 cm in thickness, 5–6 cm in width and 8 cm in length. Then, all the raw materials but the chicken were chopped with a chopper plate. Separately, the chicken blocks were chopped with a cutter until they came to exhibit a paste-like consistency. At this point, appropriate amounts of common additives such as seasoning, spices, salt, sodium nitrite, nitrates, sodium L-ascorbate, polyphosphates, sorbic acid and soybean protein were added to and mixed with the chicken paste. This mixture was kneaded well to form a binder.

The binder so prepared was mixed with the other chopped meat. Further, fat (i.e., small cubes of lard) was added and mixed to obtain a raw meat mixture for the manufacture of salami.

Formation of surimi sheets:

Surimi of codfish which had been prepared in the usual manner was heated and dried to form two continuous sheets having a width of 50 cm and a thickness of 1.5 mm. These continuous sheets were rolled up like belts.

Formation of a sandwich-like food:

While one of the aforesaid surimi sheets rolled up like belts was being moved on a belt conveyor, the aforesaid raw meat mixture for the manufacture of salami was ejected through a fan-shaped nozzle attached to the tip of a spiral-high pressure pump and placed thereon so as to form a continuous layer having a thickness of about 5 mm and a width of 35 cm. While the surimi sheet with the raw meat mixture placed thereon was still being moved, the other surimi sheet was superposed thereon. The components thus combined were passed between two rollers adjusted to a predetermined spacing to obtain a sandwich-like product having an average thickness of about 5 mm. Then, this sandwich-like product was cut into strips measuring about 11–13 cm×50 cm. These strips were placed on screens, which were mounted on a push car and introduced into a chamber kept at a humidity of about 80% and a temperature of about 80° C. Thus, the strips were heated for about 1.5 hours to raise their temperature to about 70° C.

The strips thus heated under controlled humidity conditions were dried at 35°–40° C. for about 10 hours with a warm-air dryer to make their overall water content uniform. After being dried, the strips were cut to a size of 2–2.5 mm, thus yielding a final product.

The product thus obtained, as a whole, gave a soft feeling to the palate and had a flavor characteristic of salami. Accordingly, it was suitable for use as a snack.

Then, in order to improve its keeping quality, the product was packed and sealed in bags made of a KOP/CP laminated film and containing, as an antimold agent, a deoxidant commercially available under the trade name of Ageless FX-100.50. Thus, no change in the quality of the product was noted even after a lapse of three months or more.

It may be mentioned parenthetically that this product had a water content of 27% or less, a nitrite content of 700 ppm or less, and a sorbic acid content of 2 g/kg or less, gave a negative test for Escherichia coli, and exhibited a water activity of 0.86 or less.

What is claimed is:

1. A process for producing surimi-based sandwiched foodstuff, which comprises the steps of:
   (a) providing a surimi base;
   (b) heating, drying and rolling said surimi base to form rolled-up continuous sheets having a thickness of about 1.5 mm.;
   (c) separately pressure-heating with steam powdered cheese to about 85 degrees C. to melting, followed by stirring under deaerating conditions to obtain molten cheese having a water content of about 50%;
   (d) unrolling a first of said continuous sheets on a horizontal surface;
   (e) depositing on said first sheet a uniform layer of molten cheese, about 5 mm. thick, from a heated container and through a fan-shaped, pressurized nozzle;
   (f) unrolling a second of said continuous sheets and superposing it on the thus layered first sheet;
   (g) pressing the thus sandwiched molten cheese to form a sandwich having an overall thickness of about 5 mm.;
   (h) cutting the thus sandwiched product into strips of a predetermined size;
   (i) keeping the cut strips at a temperature of about 5-15 degrees C. for 8-10 hours to render the water content uniform throughout; and
   (j) drying said strips with cold air to adjust the water content of the product to about 34-38%.

2. A process for producing surimi-based sandwiched foodstuff, which comprises the steps of:
   (a) providing a surimi base;
   (b) heating, drying and rolling said surimi base to form rolled-up, continuous sheets having a thickness of about 1.5 mm.;
   (c) separately pressure-heating with steam to about 85 degrees C. powdered cheese, adding thereto a predetermined amount of minced salami, increasing the temperature to about 90 degrees C., followed by stirring under deaerating conditions to obtain a salami-molten cheese mixture having a water content of about 50%;
   (d) unrolling a first of said continuous sheets on a horizontal surface;
   (e) depositing on said first sheet a uniform layer of salami-molten cheese mixture, about 5 mm. thick, from a heated container and through a fan-shaped, pressurized nozzle;
   (f) unrolling a second of said continuous sheets and superposing it on the thus layered first sheet;
   (g) pressing the thus sandwiched salami-molten cheese mixture to form a sandwich having an overall thickness of about 5 mm.;
   (h) cutting the thus sandwiched product into strips of a predetermined size;
   (i) keeping the cut strips at a temperature of about 5-15 degrees C. for 8-10 hours to render the water content uniform throughout; and
   (j) drying said strips with cold air to adjust the water content of the product to about 34-38%.

3. A process for producing a surimi-based sandwiched foodstuff, which comprises the steps of:
   (a) providing a surimi base;
   (b) heating, drying and rolling said surimi base to form rolled-up, continuous sheets having a width of about 50 cm. and a thickness of about 1.5 mm.;
   (c) separately pressure-heating with steam to about 85 degrees C. powdered cheese, adding thereto a comminuted and well-kneaded salami raw meat mixture containing sodium nitrite, nitrates, polyphosphates, sodium L-ascorbate, sorbic acid and seasonings, increasing the temperature to about 90 degrees C., followed by stirring under deaerating conditions to obtain a salami meat-molten cheese mixture having a water content of about 50%;
   (d) unrolling a first of said continuous sheets on a horizontal surface;
   (e) depositing on said first sheet a uniform layer of salami raw meat-molten cheese mixture, about 5-8 mm. thick, from a heated container and through a fan-shaped, pressurized nozzle;
   (f) unrolling a second of said continuous sheets and superposing it on the thus layered first sheet;
   (g) pressing the thus sandwiched salami raw meat-molten cheese mixture to form a sandwich having an overall thickness of about 5 mm.;
   (h) cutting the thus sandwiched product into strips of a predetermined size;
   (i) keeping the strips under controlled conditions of 80% relative humidity and 80 degrees C. for about 1.5 hours; and
   (j) drying said strips at 35-40 degrees C. with warm air at about 35-40 degrees C. to adjust the water content of the product to 34-38%.

4. The process according to claims 1, 2 or 3, wherein said unrolling of first sheet is effected onto a moving horizontal surface, said depositing of said layer is effected on the moving first sheet, and said unrolling of said second sheet is effected on the moving, layered first sheet.

5. A surimi-base sandwiched foodstuff prepared in accordance with the process of claim 1.

6. A surimi-base sandwiched foodstuff prepared in accordance with the process of claim 2.

7. A surimi-base sandwiched foodstuff prepared in accordance with the process of claim 3.

8. A process for producing sandwich-like foods which comprises the steps of heating and drying surimi to form first and second continuous sheets thereof, ejecting molten cheese or molten cheese filled with minced salami and placing said cheese or filled cheese on the first continuous sheet of surimi so as to form a continuous layer;

said molten cheese being prepared by placing powdered process cheese in a high-pressure pot, heating the cheese for five to seven minutes with the introduction of steam until the temperature reaches about 85° C., and then stirring the cheese under deaerating conditions;

superimposing thereon the second continuous sheet of surimi;

processing these components into a sandwich form, cutting the resulting sandwich-like product into pieces of predetermined size; and drying the pieces at a temperature lower than room temperature so as to adjust their water content to a level of about 34% to about 38%.

9. A process as claimed in claim 8 wherein the drying is carried out at a temperature of about 5° C. to 10° C.

10. A process as claimed in claim 8 wherein the step of ejecting molten cheese or molten cheese filled with minced salami is carried out by ejecting said cheese or filled cheese through a fan-shaped nozzle attached to the tip of a spiral-high pressure pump.

11. A process as claimed in claim 8 wherein the step of drying the pieces of the sandwich-like product is carried out by allowing the pieces to stand at a temperature of about 5° C. to about 15° C. for a period of about 8 to 10 hours and then drying them for about 1 hour with a cold-air dryer having an air temperature of about 5° C. to 10° C.

* * * * *